F. C. DE VALLANT & R. WEAVER.
TRANSMISSION MECHANISM FOR AUTOMOBILES.
APPLICATION FILED SEPT. 10, 1914.
1,147,488.
Patented July 20, 1915.
2 SHEETS—SHEET 1.
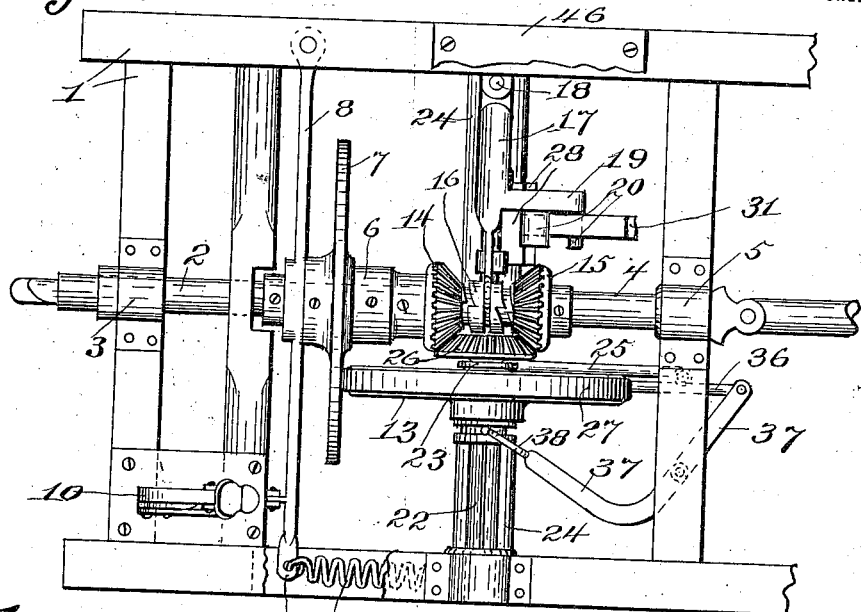
Fig. 1.
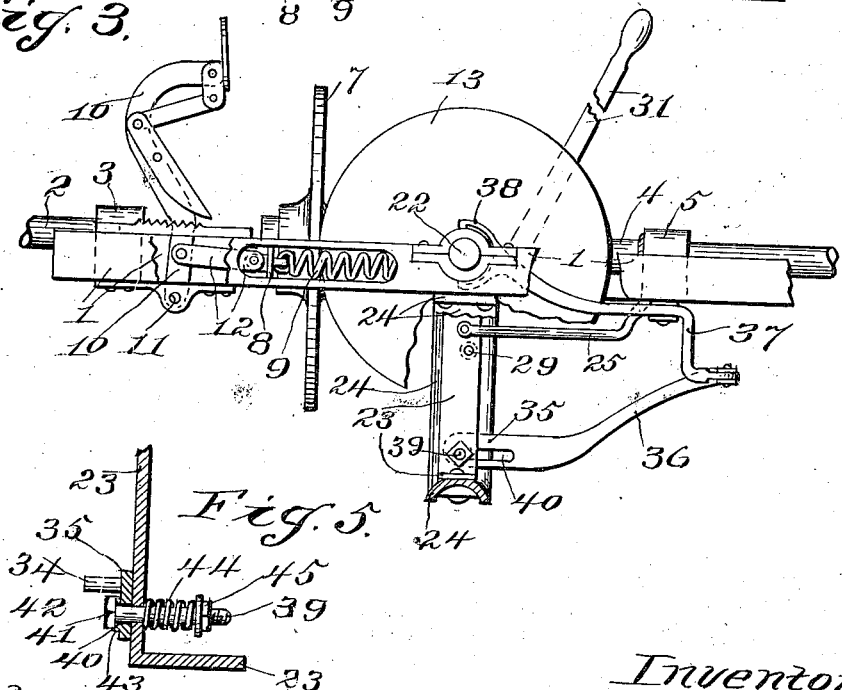
Fig. 3.
Fig. 5.
Witnesses:
R. F. Lansdale
W. F. Crossman
Inventors:
Fred C. DeVallant and
Ross Weaver
By C. F. Belt
Attorney

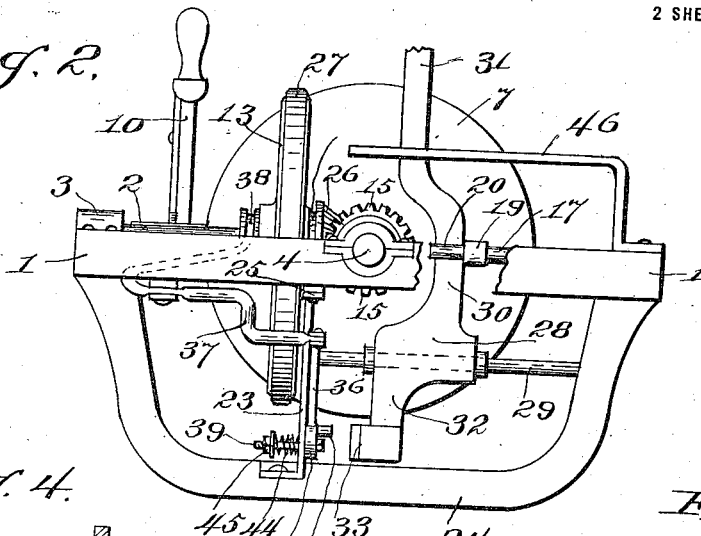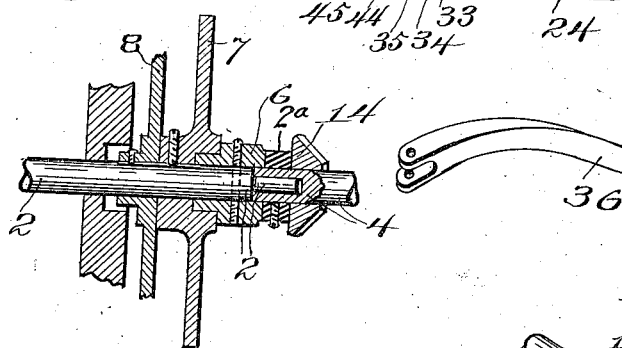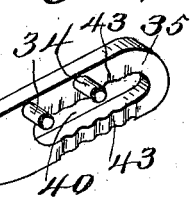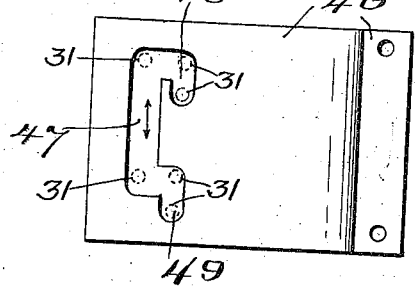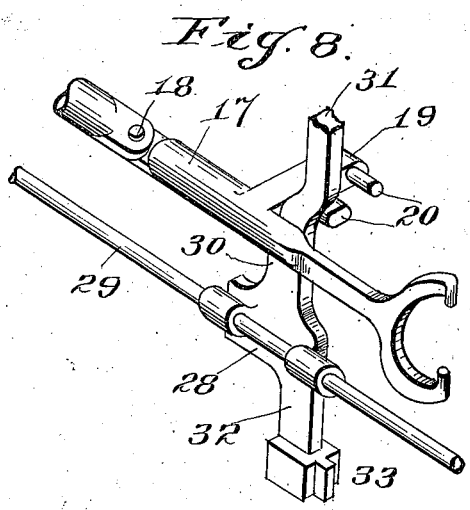

UNITED STATES PATENT OFFICE.

FRED C. DE VALLANT, OF EARLVILLE, AND ROSS WEAVER, OF PLYMOUTH, NEW YORK.

TRANSMISSION MECHANISM FOR AUTOMOBILES.

1,147,488.  Specification of Letters Patent.  Patented July 20, 1915.

Application filed September 10, 1914. Serial No. 861,091.

*To all whom it may concern:*

Be it known that we, FRED C. DE VALLANT and Ross WEAVER, citizens of the United States, residing, respectively, at Earlville, in the county of Madison and State of New York, and at Plymouth, county of Chenango, State of New York, have invented certain new and useful Improvements in Transmission Mechanism for Automobiles, of which the following is a specification.

This invention relates to frictional gear transmission for automobiles, and pertains especially to gear shifting and locking mechanism.

The object of the invention is to provide a transmission gearing for automobiles, motor cars, and self-propelled vehicles, which shall permit of the vehicle being operated by direct transmission, or at a high rate of speed, or at any rate of speed as may be desired.

A further object of the invention is to provide novel and peculiar mechanism for manually shifting and locking a frictional wheel relative to a frictional disk so as to produce various rates of speed transmitted from a motor-driven shaft.

A still further object of the invention is to provide in a transmission mechanism, a manually operated lever having swinging and sliding movements for operating a wheel shifting lever, and to furnish novel and peculiar means for locking the manual lever.

A still further object of the invention is to provide a pair of wheel shifting levers one of which is slidable by means of a pivoted and slidable hand operated lever.

Various other advantages and improved results are attainable in the practical application of the invention.

In the accompanying drawings forming part of this application:—Figure 1 is a top view, partly broken away. Fig. 2 is a rear end view. Fig. 3 is a side view partly broken away. Fig. 4 is a detail central longitudinal sectional view. Fig. 5 is an enlarged detail sectional view showing the slotted lever mounting. Fig. 6 is a detail perspective view of the slotted lever. Fig. 7 is a detail top view of the indicator plate. Fig. 8 is a detail perspective view of the manually operated lever head and clutch lever.

The same reference characters denote the same parts throughout the several views of the drawings.

The supporting frame 1, has a driven shaft 2, journaled therein at 3, and the inner end of said shaft is journaled in the inner end of a shaft 4 which is journaled in the frame at 5 and driven by a motor shaft. A sleeve 6 is secured to the shaft 2 and projects over the joining ends of the shafts 2 and 4, so as to form a mounting for a friction disk 7 secured to the shaft 2 adjacent to the inner end thereof. A bar 8 is secured to the shaft 2. One end of said arm is pivoted to one side of the frame 1, and the other end is attached to a spiral spring 9 secured within the opposite side of the frame. The bar 8 is operated by a presser foot lever 10, pivoted at 11, and pivotally connected with the spring-controlled end of the bar by means of a link 12. Obviously the movement of the foot lever will be imparted to the shaft 2 and to the disk 7 secured thereto for sliding the disk out of engagement with a friction wheel 13 hereinafter more particularly referred to, it being understood that the hollow end of the shaft 4 and the reduced end of the shaft 2 are of such length as to permit of said sliding movement without disengagement. A beveled gear wheel 14 is loosely mounted on the shaft 4, and works against a collar 2ª secured to the shaft 4. A like gear wheel 15 is loosely mounted on the shaft 4, with a collar 3ª, and a clutch element 16 is keyed to and slidable on the shaft 4 between the gears 14 and 15 so as to engage the clutch face of said gears. The clutch is engaged by an L-shaped forked lever having its long arm 17 pivoted at 18, and its short arm 19 is provided with stop pins 20 for holding a shifting lever 31, hereinafter more particularly referred to.

A shaft 22 is journaled at one end in the frame 1, and at the other end in a standard 23 supported by a yoke 24 secured to the frame 1, and braced by a bar 25, and said shaft is provided with a beveled pinion 26 meshing with the gears 14 and 15. The wheel 13 is slidably secured to the shaft 17 and has a friction ring 27 secured in the periphery thereof for traversing the face of the friction disk 7.

The mechanism for sliding the clutch 16 and the wheel 13, comprises the lever head 28 pivotally and slidably mounted on a rod 29 secured to the standard 23 and to the yoke 24, and said head has a curved arm 30 from which extends the hand lever 31, and a depending arm 32 having a lug 33, for engagement between a pair of pins 34 projecting from the link 35 of a lever 36, pivoted to a lever 37 having a forked end 38 engaging the hub of the wheel 13. A special cushioned connection is made between the link 35 and the standard 23, which will now be described.

A bolt 39 extends through the slot 40 of the link and has a head 41 provided with teeth 42 for engaging a pair of link racks 43 on the same face of the link as the pins 34. The bolt is cushioned by a spiral spring 44 surrounding the bolt and abutting against a bolt nut 45, and the side of the standard, so as to permit the link to be slid and yet prevent accidental sliding of the link.

A plate 46 is secured in proper position relative to the hand lever 31, and said plate is provided with a slot 47 having offset slots 48 and 49. The lever 31 is moved to one end of the slot 47 for high speed and to the other end of the slot 47 for low speed. The lever 31 is slid into the offset slots 48 and 49 for holding the lever to high and low speed positions. The slots 48 and 49 permit sufficient movement of the lever 31 and the head 28 along the rod 29 for the portion 30 of said lever to engage between the pins 20, whereby when the lever 31 is given pivot movement the clutch element 16 is moved. When the head 28 is given sliding movements on the rod 29 the lug 33 engages and disengages the link pins 34, and the pivot movement of the lever 31 and the head 28 while the lug is engaged with the pins 34 slides the link 36 which moves the lever 37, for sliding the wheel 13. The clutch element 16 remains in engagement with the gear 14 during the progress of the lever 31 in the slot 47, and the lever is slid into the offset slots 48 and 49 for transmitting power at reverse speeds.

We do not wish to be understood as confining our invention to any particular size, shape or material, nor do we wish to limit ourselves to any particular means for assembling the parts thereof, or in the scope of practical application of the invention, but reserve the right to make such changes and various arrangements as may come within the scope of the appended claims without departing from the spirit of the invention.

Having thus described our invention what we claim as new and desire to secure by Letters Patent is:—

1. In transmission mechanism for motor vehicles, a driving shaft, a pair of bevel gears loosely mounted on the shaft, clutch elements on said gears, a clutch element attached to and slidable on the shaft, a driven shaft slidably connected with the driving shaft, a friction disk secured to the driven shaft, a shaft perpendicular to the said shafts and having a pinion engaging the bevel gears, a friction wheel slidably secured to the perpendicular shaft for engaging the disk, and means for sliding the clutch element and the friction wheel at right angles comprising a clutch lever, a sliding and swinging hand lever engaging the clutch lever, and a pair of connected levers one of which engages said wheel and the other of which is operated by the hand lever.

2. In transmission mechanism for motor vehicles, a driving shaft, a pair of bevel gears loosely mounted on the shaft, clutch elements on said gears, a clutch element attached to and slidable on the shaft, a driven shaft slidably connected with the driving shaft, a friction disk secured to the driven shaft, a shaft perpendicular to the said shafts and having a pinion engaging the bevel gears, a friction wheel slidably secured to the perpendicular shaft for engaging the disk, a pair of levers pivoted together for sliding movement at right angles, one of said levers being attached to the friction wheel, a clutch lever, and a swinging hand lever engaging the clutch lever and having slidable engagement with the other lever of said pair of levers.

3. In transmission mechanism for automobiles, a driving shaft, a pair of gear wheels loosely mounted on the shaft, a clutch attached to and slidable on the shaft between the gears for engagement therewith, a driven shaft slidably connected with the driving shaft, a friction disk secured to the driven shaft, a shaft perpendicular to the said shafts and having a pinion engaging the gear wheels, a friction wheel slidably secured to the perpendicular shaft for engaging the disk, a lever projecting from the friction wheel, a clutch lever having pins, a hand lever engaging between said pins for operating the clutch lever, and means for imparting the movement of the hand lever to the wheel lever for sliding the wheel.

4. In transmission mechanism for automobiles, a driving shaft, a pair of gear wheels loosely mounted on the shaft, a clutch attached to and slidable on the shaft between the gears for engagement therewith, a driven shaft slidably connected with the driving shaft, a friction disk secured to the driven shaft, a shaft perpendicular to the said shafts and having a pinion engaging the gear wheels, a friction wheel slidably secured to the perpendicular shaft for engaging the disk, a lever projecting from the friction wheel, a clutch lever having pins, a hand lever for engaging between said pins for operating the clutch lever, and a slidable lever pivoted to the wheel lever and operated by the hand lever for sliding the wheel.

In witness whereof we hereunto set our hands in the presence of two witnesses.

FRED C. DE VALLANT.
ROSS WEAVER.

Witnesses:
MABEL F. KENT,
DAVID F. LEE.

Copies of this patent may be obtained for five cents each, by addressing the "Commissioner of Patents, Washington, D. C."